H. D. MORTON.
CONTROL SYSTEM FOR ELECTRIC ARC WELDING MECHANISM.
APPLICATION FILED FEB. 21, 1917. RENEWED OCT. 30, 1917.
1,278,982.
Patented Sept. 17, 1918.
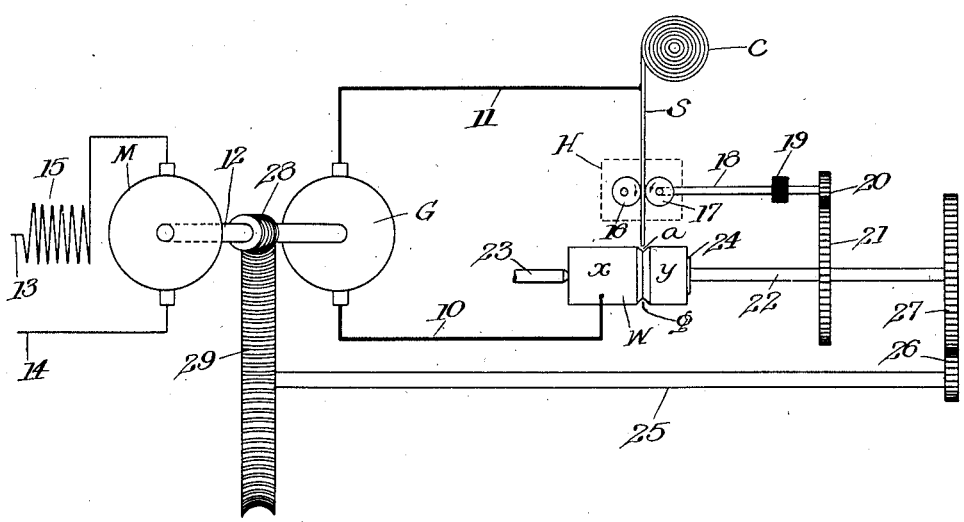

UNITED STATES PATENT OFFICE.

HARRY D. MORTON, OF DETROIT, MICHIGAN, ASSIGNOR TO AUTOMATIC ARC WELDING COMPANY, OF DETROIT, MICHIGAN, A CORPORATION OF MICHIGAN.

CONTROL SYSTEM FOR ELECTRIC-ARC-WELDING MECHANISM.

1,278,982. Specification of Letters Patent. Patented Sept. 17, 1918.

Application filed February 21, 1917, Serial No. 150,110. Renewed October 30, 1917. Serial No. 199,380.

*To all whom it may concern:*

Be it known that I, HARRY D. MORTON, a citizen of the United States, residing at Detroit, in the county of Wayne and State of Michigan, have invented certain new and useful Improvements in Control Systems for Electric-Arc-Welding Mechanism, of which the following is a description.

My invention relates to electric arc welding and particularly to a control system for a metallic electrode arc welding mechanism in which a metallic electrode in the form of a strip or wire of welding material is fed to the arc and to the work.

I have found that it is essential for the practical successful operation of this form of electric arc welding that an equilibrium be maintained between the rate of fusing of the strip of welding material and the rate at which said welding material is fed to the arc. I have also found that under normal conditions this equilibrium is maintained by the arc itself which has, within certain limits, a compensatory action as follows:

When the arc shortens the resistance decreases, the amperage rises and this rise in amperage results in the welding strip fusing more rapidly, thereby causing the arc to lengthen. Conversely, when the arc lengthens, the welding strip is fused more slowly and the continuously moving welding strip restores the arc to its normal length.

While as I have stated this compensatory action of the arc will maintain the necessary equilibrium between the rate of fusing and the rate of welding strip feed, this takes place only within relatively narrow limits. I have found that in practice due perhaps to differences in the fusibility of conductivity of the welding strip or of the work, it frequently occurs that the range of the compensatory action of the arc is insufficient to prevent either a short circuiting of the welding strip upon the work or a rupture of the arc due to its becoming too long. In order to overcome this difficulty, I have devised a method and system by means of which the equilibrium is automatically maintained within any desired limit to control the rate at which the welding strip is fed to the arc.

The drawing is a diagram of a system illustrative of a mechanism by means of which my method of controlling the arc may be carried out.

Referring to the drawing, G represents a generator for supplying suitable electric welding current to the welding circuit which includes the wires 10 and 11. The generator G is connected by a shaft 12 to a series wound electric motor M or other suitable motive power. The motor M is supplied with electric current from the wires 13 and 14, the current through the wire 13 passing to the motor through a series field coil 15 so that the field excitation of the motor will be proportional to the load on the motor.

The wire 10 of the welding circuit is electrically connected to the work W and the wire 11 is electrically connected to the welding strip or wire S which consists of an iron or other metal wire of suitable composition fed to the arc from a coil $c$. In the diagram the work is shown as consisting of two circular pieces of metal $x$ and $y$ having abutting tapering ends forming a V-shaped groove $g$. The end of the metal strip S is fused by an arc formed between it and the work at $a$ and the fused metal is deposited in the groove $g$ as the work W is rotated about its axis, thus forming an annular weld on the work.

The welding strip S is continuously and uninterruptedly fed from the coil $c$ to the arc at $a$ by feed rolls 16 and 17 mounted within a welding head or welding strip carrier H shown in dotted lines. The feed rolls 16 and 17 have gripping faces to engage the strip S and may be geared together so that their opposed faces will rotate in the directions indicated by the arrows to feed the strip S to the arc at $a$. The feed roll 17 is mounted on or driven by a shaft 18 which carries an insulating coupling 19 to prevent a flow of current from the welding strip S through the shafting. The feed roll shaft 18 is connected by suitable gears 20 and 21 to another shaft 22 which rotates the work W. The work W is supported at one end upon a stationary point 23 and at its other end there is a chuck 24 which is connected to the shaft 22 so that the grooved part $g$ of the work will be moved past the end of the welding strip S as the shaft 22 rotates.

The shaft 22 is driven from a jack shaft 25 by the gears 26 and 27 and the shaft 25 is driven from the shaft 12 by a worm 28 which meshes with a worm gear 29 on the jack shaft 25. It will thus be seen that the motor or prime mover which drives the generator G also moves the work relatively to the welding head and feeds the welding strip to the work to maintain the welding arc and to deposit the welding material on the work. I have found that it is necessary to provide for a very great gear reduction between the motor speed and the speed of rotation of the work and the speed of the welding strip feed since the motor or prime mover might run say 1200 R. P. M. whereas the work might rotate only once in two minutes. This gear reduction is illustrated diagrammatically by the gearing in the drawing.

The operation of the system is briefly as follows:

The welding current is supplied to the welding circuit by the generator G which is being driven by the motor M. The motor M also drives the feeding mechanism and the mechanism which rotates the work or which moves the work and welding head relatively to each other. The arc is formed at *a*. When the arc shortens the resistance decreases, the amperage rises and the load on the generator G will increase causing a proportional increase in the load on the motor M. This increase of load will cause the motor to slow down and this slowing of the speed of the motor will cause a proportionate decrease in the speed with which the welding strip is fed to the arc at *a* until normal conditions are again obtained. On the other hand when the arc at *a* lengthens the resistance increases, the amperage supplied by the generator G decreases and the load on the motor M then decreases proportionately, as a consequence of which the motor tends to speed up. The increase of the speed of the motor M will cause the welding strip S to be fed more rapidly to the arc *a* which will finally restore the arc to its normal length.

I have thus disclosed a means whereby the amperage of the arc is controlled by driving the generator and the feeding mechanism by a common motive power, the speed of which is responsive to changes in the amperage of the arc, or to abnormal changes in the current flowing in the welding circuit. The welding strip feeding means is continuously and directly operated by the motor or other similar prime mover which drives the generator supplying the welding current. I have found that in this arrangement the welding strip feed will respond very quickly to changes in the amperage of the arc. For instance, a twenty horse power series motor used as a motive power for the generator will likely respond to about 3% changes in load thereon within two seconds.

It is to be understood that the system disclosed in the drawing and herein described is merely illustrative and that various changes may be made in the arrangement of the parts without departing from the spirit of the invention. For instance, it will be understood that while I have shown my invention as applied to a metallic electrode electric arc welding mechanism in which the welding head is stationary and the work is rotated, the invention is clearly applicable to a mechanism in which the welding head H is movable and the work W held stationary or in which the welding head is stationary and the work W rotates around a vertical axis instead of a horizontal axis.

Having fully described the invention, what is claimed and desired to be secured by Letters Patent is:

1. In automatic metallic electrode electric arc welding in which a generator supplies current to the arc and a mechanism feeds a welding strip to the arc, the method of controlling the amperage of the arc which consists in driving said generator and said feeding mechanism by a common motive power the speed of which is responsive to changes in the amperage of the arc.

2. In metallic electrode electric arc welding, wherein the work constitutes one electrode and a metallic welding strip or welding wire constitutes the other electrode, the method herein described which comprises driving, by motive power responsive in speed to changes in load, the generator which supplies welding current to the arc and also a mechanism which feeds said welding strip or welding wire to the arc and effects relative movement between said work and a carrier for said welding strip.

3. In metallic electrode electric arc welding wherein the work constitutes one electrode, and a metallic welding strip or welding wire constitutes the other electrode, the method of causing the amperage of the arc to control the rate at which wire is fed to said arc, which consists in driving the generator which supplies welding current to the arc and the mechanism which feeds the welding strip or welding wire to the arc and effects relative movement between said work and a carrier for said welding strip or welding wire, by a common motive power the speed of which is responsive to changes in the amperage of the arc.

4. In antomatic metallic electrode electric arc welding, in which the work constitutes one electrode and a metallic welding strip or welding wire constitutes the other electrode, the method of controlling the supply of current to the arc and the feed of the welding strip to the arc which comprises driving the current supplying generator and the welding strip feeding mechanism by a motor responsive in speed to variations in the load thereon.

5. In metallic electrode electric arc welding, in which the work constitutes one electrode and a metallic welding strip or welding wire constitutes the other electrode, the method of controlling the supply of current to the arc, the feed of the welding strip to the arc and the relative movement of the work and welding strip carrier, which comprises driving the current supply generator, the welding strip feeding mechanism and the mechanism which effects relative movement between said work and said carrier, by a motor responsive in speed to variations in the load thereon.

6. In automatic metallic electrode electric arc welding, in which the work constitutes one electrode and a metallic welding strip or welding wire constitutes the other electrode, the method of controlling the current supplied to the arc and the feed of the welding strip to the arc which comprises driving the current supplying generator and the welding strip feeding mechanism by an electric motor responsive in speed to changes in the load thereon.

7. In metallic electrode electric arc welding, the combination with a welding circuit including the work, a metallic welding strip and a generator for supplying current to said circuit, of a motor for driving said generator, means for feeding said welding strip toward the work to maintain an arc between the work and the end of the welding strip and to supply welding material to the work, and means whereby said motor drives said welding strip feeding means.

8. In metallic electrode electric arc welding, the combination with a welding circuit including a generator, the work, and a welding strip, of a motor for driving said generator, a welding head, means for feeding the welding strip from said head to the work to maintain the arc and to supply welding material thereto to be deposited on the work, means for producing relative movement between said work and said welding head, and means whereby said welding strip feeding means is driven by said electric motor.

9. In an automatic metallic electrode electric arc welding system, the combination of a welding circuit including an electric generator, the work and a metallic welding strip, means for feeding said welding strip to the arc to maintain the arc and supply welding material to be deposited on the work, a series wound electric motor driving said generator and responsive in speed to changes in the amperage of the current flowing in said welding circuit, and means including speed reduction gearing forming a driving connection between said motor and the welding strip feeding means.

10. In an automatic metallic electrode electric arc welding system, the combination of a welding circuit including an electric generator, the work and a metallic welding strip, means for feeding said welding strip to the arc to maintain the arc and supply welding material to be deposited on the work, means for rotating the work while the welding material is being deposited thereon, a motive power driving said generator and responsive in speed to changes in the amperage of the current flowing in said welding circuit, and means including speed reduction gearing forming a driving connection between said motive power and both said welding strip feed means and said work rotating means.

11. In an automatic metallic electrode electric arc welding system, the combination of a welding circuit including an electric generator, the work and a metallic welding strip, a welding head, means for continuously feeding said welding strip to the arc to maintain the arc and supply welding material to be deposited on the work, means for effecting relative movement between said welding head and said work while welding material is being deposited on said work, an electric motor driving said generator and responsive in speed to changes in the amperage of the current flowing in said welding circuit, and means including speed reduction gearing forming a driving connection between said motor and both said welding strip feeding means and said means for effecting relative movement between the welding head and the work.

12. In automatic metallic electrode electric arc welding, in which the work constitutes one electrode and a metallic welding strip or welding wire constitutes the other electrode, the method of controlling the current supplied to the arc and the feed of the welding strip to the arc in order to maintain the arc and prevent short-circuiting of the electrodes or rupture of the arc and also to supply metal to be deposited upon the work, which comprises driving the current supplying generator and the welding strip feeding mechanism by a motive power having a driving element responsive to changes in load.

In testimony whereof I affix my signature.

HARRY D. MORTON.